(12) United States Patent
Moon et al.

(10) Patent No.: US 10,579,374 B2
(45) Date of Patent: Mar. 3, 2020

(54) METHOD FOR CONVERTING APPLICATION AND COMPUTING DEVICE

(71) Applicant: SAMSUNG SDS CO., LTD., Seoul (KR)

(72) Inventors: Jong-Gurl Moon, Seoul (KR); Dong-Moon Kim, Seoul (KR); Seung-Yong Shin, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 142 days.

(21) Appl. No.: 15/812,341

(22) Filed: Nov. 14, 2017

(65) Prior Publication Data

US 2018/0136932 A1 May 17, 2018

(30) Foreign Application Priority Data

Nov. 14, 2016 (KR) ........................ 10-2016-0150960

(51) Int. Cl.
*G06F 8/76* (2018.01)
*H04L 29/08* (2006.01)
*G06F 8/41* (2018.01)
*G06F 8/53* (2018.01)
*G06F 9/445* (2018.01)

(52) U.S. Cl.
CPC ................ *G06F 8/76* (2013.01); *G06F 8/427* (2013.01); *G06F 8/53* (2013.01); *G06F 9/445* (2013.01); *H04L 67/2823* (2013.01); *H04L 67/34* (2013.01)

(58) Field of Classification Search
CPC ... G06F 8/76; G06F 8/53; G06F 8/427; G06F 9/445; H04L 67/2823; H04L 67/34
USPC ........................................................ 717/168
See application file for complete search history.

(56) References Cited

U.S. PATENT DOCUMENTS

| | | | | |
|---|---|---|---|---|
| 6,348,927 B1 * | 2/2002 | Lipkin | ..................... | H04L 67/02 345/619 |
| 6,606,095 B1 * | 8/2003 | Lengyel | ................... | G06T 9/001 345/473 |
| 6,879,926 B2 * | 4/2005 | Schmit | ...................... | G06F 8/71 702/119 |

(Continued)

FOREIGN PATENT DOCUMENTS

| | | | | | |
|---|---|---|---|---|---|
| CN | 103268284 A | * | 8/2013 | .............. | G06F 11/00 |
| CN | 106415488 A | * | 2/2017 | ......... | G06F 9/44521 |
| WO | WO-2018039875 A1 | * | 3/2018 | ............. | G06F 9/445 |

OTHER PUBLICATIONS

Gottlob et al., "A comparison of structural CSP decomposition methods", May 2000, Elsevier Science B.V. (Year: 2000).*

(Continued)

*Primary Examiner* — Wei Y Zhen
*Assistant Examiner* — Junchun Wu
(74) *Attorney, Agent, or Firm* — Sughrue Mion, PLLC

(57) ABSTRACT

Provided are a computing device and a method of converting an application. The method is performed by the computing device including one or more processors and a memory storing one or more programs executed by the one or more processors, and includes decomposing an original application package, extracting an application-executing section from the decomposed original application package, and merging a proxy class set including one or more modified classes with the application-executing section.

12 Claims, 4 Drawing Sheets

(56) References Cited

U.S. PATENT DOCUMENTS

| | | | | |
|---|---|---|---|---|
| 7,721,280 B1* | 5/2010 | Frisbie | ............... | H04L 67/06 717/172 |
| 7,996,353 B2* | 8/2011 | Chan | ............... | G06N 5/02 706/48 |
| 8,010,701 B2* | 8/2011 | Wilkinson | ............... | H04L 67/1023 709/245 |
| 8,307,109 B2* | 11/2012 | Mamou | ............... | G06F 16/254 709/232 |
| 8,918,448 B2* | 12/2014 | DeLuca | ............... | G06F 8/61 709/200 |
| 2001/0014868 A1* | 8/2001 | Herz | ............... | G06Q 10/0637 705/14.38 |
| 2004/0098154 A1* | 5/2004 | McCarthy | ............... | G06F 17/50 700/97 |
| 2004/0205411 A1* | 10/2004 | Hong | ............... | G06F 21/566 714/38.1 |
| 2008/0094403 A1* | 4/2008 | Bakalash | ............... | G06F 9/5066 345/505 |
| 2008/0148234 A1* | 6/2008 | Clemm | ............... | G06F 16/2379 717/121 |
| 2009/0063584 A1* | 3/2009 | Abzarian | ............... | G06F 8/71 |
| 2010/0070961 A1* | 3/2010 | Auer | ............... | G06F 8/65 717/168 |
| 2010/0199257 A1* | 8/2010 | Biggerstaff | ............... | G06F 8/456 717/104 |
| 2011/0321032 A1* | 12/2011 | Ciccone | ............... | G06F 8/65 717/171 |
| 2015/0277899 A1* | 10/2015 | Hamby | ............... | G06F 8/41 717/120 |
| 2015/0277938 A1* | 10/2015 | Lu | ............... | G06F 9/451 717/168 |
| 2016/0124744 A1* | 5/2016 | Kruglick | ............... | G06F 3/04817 717/121 |

OTHER PUBLICATIONS

Lyle et al., "A program decomposition scheme with applications to software modification and testing", 1989, IEEE (Year: 1989).*

Palomar et al., "A Tutorial on Decomposition Methods for Network Utility Maximization", Aug. 2006, IEEE, vol. 24, No. 8, (Year: 2006).*

Smaragdakis et al., "An Object-Oriented Implementation Technique for Refinements and Collaboration-Based Designs", Apr. 2002, ACM, vol. 11, No. 2, pp. 215-255. (Year: 2002).*

* cited by examiner

FIG. 2

| AndroidManifest.xml ||
|---|---|
| META-INF/ | assets/ |
| resources.arsc | lib/ |
| classes.dex | res/ |

METHOD FOR CONVERTING APPLICATION AND COMPUTING DEVICE

CROSS-REFERENCE TO RELATED APPLICATION

This application claims priority to and the benefit of Korean Patent Application No. 10-2016-0150960, filed on Nov. 14, 2016, the disclosure of which is incorporated herein by reference in its entirety.

BACKGROUND

1. Field

The present disclosure relates to a technology for converting an application.

2. Discussion of Related Art

Enterprise mobility management (EMM) is an enterprise mobile security solution encompassing functions of existing mobile device management (MDM) and mobile application management (MAM). In particular, with the widespread use of mobile terminals, mobile trends such as bring your own device (BYOD) which enables a staff member to use his or her personal terminal for work and company-issued personal enabled (COPE) which allows a specific terminal issued by a company to be used for both work and personal use are recently proliferating.

However, since personal terminals are used for both work and personal use in this manner, there is growing anxiety about business secret leaks. Accordingly, there are increasing demands for hardware control functions, such as wireless Internet (WiFi) control, camera control, global positioning system (GPS) control, communication control, and the like, of a terminal and dynamic control over enterprise applications required for work, such as email, a messaging service, an in-company system, and the like.

To control an enterprise application in connection with EMM or the like, it is necessary to separately develop the enterprise application using an application programming interface (API) provided by EMM. However, in this case, all of the various existing enterprise applications are redeveloped on the basis of EMM, leading to problems in cost and time. Consequently, a method for effectively converting an existing enterprise application to include an additional function, such as EMM, is necessary instead of separate development of a new enterprise application.

SUMMARY

The present disclosure is directed to providing a technical means for converting an existing application to additionally include a desired policy and function.

According to an aspect of the present disclosure, there is provided a method for converting an application, the method being performed by a computing device including one or more processors and a memory storing one or more programs executed by the one or more processors and including: decomposing an original application package; extracting an application-executing section from the decomposed original application package; and merging a proxy class set including one or more modified classes with the application-executing section.

The merging of the proxy class set with the application-executing section may include parsing the application-executing section and merging the proxy class set with a class definition field of the parsed application-executing section.

The proxy class set may include: one or more application programming interfaces (APIs) used to execute the one or more modified classes; and one or more pieces of policy information imported by the APIs.

The APIs may include program-executing code for receiving the policy information from a preset remote server and updating the policy information.

The method may further include, after the merging of the proxy class set with the application-executing section: replacing at least some of the classes imported into the application-executing section with the one or more modified classes in the proxy class set; and generating a modified application package including the application-executing section in which the at least some classes have been replaced with the modified classes.

The method may further include, after the decomposing of the original application package: extracting an information file related to running of the original application package from the decomposed original application package; and changing a package name of the original application package in the information file.

The method may further include, after the decomposing of the original application package: extracting an icon file of the original application package from the decomposed original application package; and replacing the icon file with a substitute icon file.

According to another aspect of the present disclosure, there is provided a computing device including: one or more processors; a memory; and one or more programs, wherein the one or more programs are stored in the memory and configured to be executed by the one or more processors and include: an instruction for decomposing an original application package; an instruction for extracting an application-executing section from the decomposed original application package; and an instruction for merging a proxy class set including one or more modified classes with the application-executing section.

The instruction for merging the proxy class set with the application-executing section may be configured to parse the application-executing section and merge the proxy class set with a class definition field of the parsed application-executing section.

The proxy class set may further include: one or more APIs used to execute the one or more modified classes; and one or more pieces of policy information imported by the APIs.

The APIs may include a program-executing code for receiving the policy information from a preset remote server and updating the policy information.

The one or more programs may further include, after the instruction for merging of the proxy class set with the application-executing section: an instruction for replacing at least some of the classes imported into the application-executing section with the one or more modified classes in the proxy class set; and an instruction for generating a modified application package including the application-executing section in which the at least some classes have been replaced with the modified classes.

The one or more programs may further include, after the instruction for decomposing the original application package: an instruction for extracting an information file related to running of the original application package from the decomposed original application package; and an instruction for changing a package name of the original application package in the information file.

The one or more programs may further include, after the instruction for decomposing the original application package: an instruction for extracting an icon file of the original application package from the decomposed original application package; and an instruction for replacing the icon file with a substitute icon file.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 2 is an example diagram illustrating a file format of an Android application package;

DETAILED DESCRIPTION OF EXEMPLARY EMBODIMENTS

Hereinafter, exemplary embodiments of the present disclosure will be described in detail with reference to the accompanying drawings. The following detailed description is provided to help comprehensive understanding of a method, an apparatus, and/or a system disclosed herein. However, it is merely exemplary, and the present disclosure is not limited thereto.

While describing the present disclosure, when it is determined that a detailed description of a known art related to the present disclosure may unnecessarily obscure the gist of the present disclosure, the detailed description will be omitted. Terms which will be described below are defined in consideration of functionality in the present disclosure, which may vary according to an intention of a user or an operator or a usual practice. Therefore, definitions thereof should be made on the basis of the overall content of this specification. Terminology used herein is for the purpose of describing exemplary embodiments of the present disclosure only and is not intended to be limiting. The singular forms are intended to include the plural forms as well, unless the context clearly indicates otherwise. It should be understood that the terms "comprises," "comprising," "includes," and "including," when used herein, specify the presence of stated features, numerals, steps, operations, elements, or combinations thereof, but do not preclude the presence or addition of one or more other features, numerals, steps, operations, elements, or combinations thereof.

Figure 1:
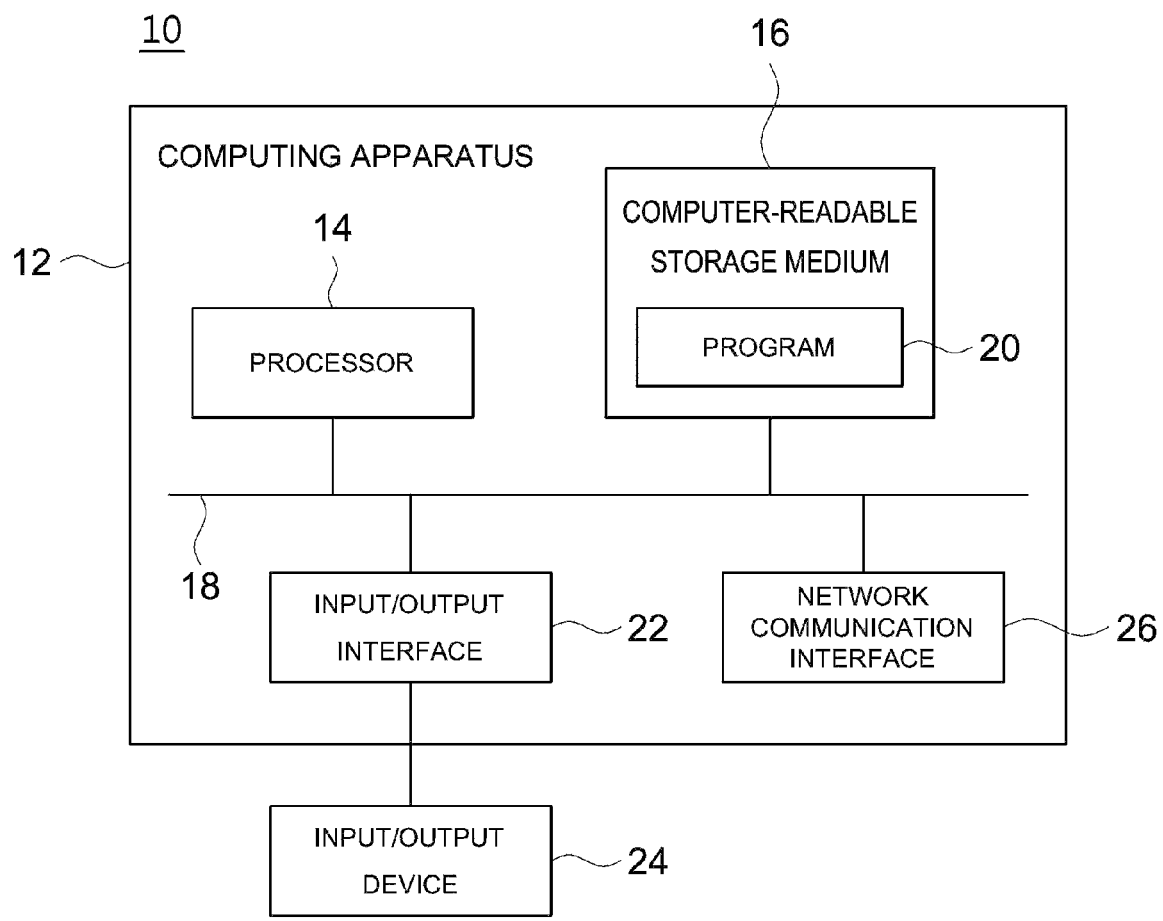
FIG. 1 is a block diagram illustrating a computing environment including a computing device appropriate for use in exemplary embodiments.

FIG. 1 is a block diagram illustrating a computing environment 10 including a computing device appropriate for use in the exemplary embodiments. In the exemplary embodiment shown in the drawing, each of the components may have a function and a capability other than those described below, and an additional component other than the components described below may be included.

The computing environment 10 shown in the drawing includes a computing device 12. In an exemplary embodiment, the computing device 12 may be a device for converting an application according to an exemplary embodiment of the present disclosure. The computing device 12 includes at least one processor 14, a computer-readable storage medium 16, and a communication bus 18. The processor 14 may cause the computing device 12 to operate according to the aforementioned exemplary embodiments. For example, the processor 14 may execute one or more programs stored in the computer-readable storage medium 16. The one or more programs may include one or more computer-executing instructions, which may be configured to cause the computing device 12 to perform operations according to an exemplary embodiment when executed by the processor 14.

The computer-readable storage medium 16 is configured to store computer-executing instructions or program code, program data, and/or information in other appropriate forms. A program 20 stored in the computer-readable storage medium 16 includes a set of instructions executable by the processor 14. In an exemplary embodiment, the computer-readable storage medium 16 may be a memory (a volatile memory such as a random access memory (RAM), a non-volatile memory, or an appropriate combination thereof), one or more magnetic disk storage devices, optical disk storage devices, flash memory devices, another form of storage medium which is accessible by the computing device 12 and capable of storing desired information, or an appropriate combination thereof.

The communication bus 18 connects various other components of the computing device 12 including the processor 14 and the computer-readable storage medium 16 to each other.

The computing device 12 may also include one or more input/output interfaces 22 for one or more input/output devices 24 and one or more network communication interfaces 26. The input/output interfaces 22 and the network communication interfaces 26 are connected to the communication bus 18. The input/output devices 24 may be connected to other components of the computing device 12 via the input/output interfaces 22. Examples of the input/output devices 24 may include input devices, such as a pointing device (a mouse, a trackpad, and the like), a keyboard, a touch input device (a touchpad, a touch screen, and the like), a voice or sound input device, various types of sensor devices, and/or a photographing device, and/or output devices, such as a display device, a printer, a speaker, and/or a network card. Examples of the input/output devices 24 may be included in the computing device 12 as components constituting the computing device 12, or may be connected to the computing device 12 as separate devices distinguished from the computing device 12.

The computing device 12 according to exemplary embodiments of the present disclosure is a device for converting an existing original application by adding an additional function, policy, or the like to the original application. In exemplary embodiments of the present disclosure, the computing device 12 is configured to extract an execution section of an application by decomposing an original application package which is a conversion target, merge a proxy class set related to an additional function with the execution section, and then generate a modified application package by recomposing the original application package. In exemplary embodiments of the present disclosure, a proxy class set refers to a set of classes including an interface which is used for an additional function to be added to an application and a class imported by a specific class of an original application package. For example, when the additional function is related to EMM, the proxy class set may be a set of classes including an interface which is used for EMM and a class imported by a specific class of the original application package. In exemplary embodiments of the present disclosure, like a proxy server of a server, a proxy class is configured to pass through the corresponding class when the internal logic of an application is called and a function required for or according to an additional function is performed. For this reason, such a class is referred to as "proxy class."

For example, the computing device 12 according to exemplary embodiments of the present disclosure may be used to add a security function, such as EMM, to an enterprise application which is developed without consideration of a security function. In this case, an enterprise and the like may easily generate an enterprise application having a security function without redeveloping an existing application. However, exemplary embodiments of the present disclosure are not limited to a specific use, such as security and the like, and may be used to apply various additional functions or policies to an existing application without restriction.

In exemplary embodiments of the present disclosure, an application package is a distribution type of application and is configured to include an executable code of the application and additional data (an execution environment, additional content, and the like) required for executing the application. For convenience of description, exemplary embodiments of the present disclosure will be described below on the basis of a format (an APK file format) of an Android application package disclosed by US Google Inc. However, it is to be noted that exemplary embodiments of the present disclosure are not limited to a specific type of file format.

FIG. 2 is an example diagram illustrating a file format of an Android application package. An Android application is generated as a file in the form of ".apk," and the corresponding file is compressed in the ZIP format. As shown in the drawing, an Android application package includes seven sections. Each of the sections will be described below.

"AndroidManifest.xml" is a binary XML file in which information required for running an Android application is stored. The information includes a package name, a name of the application, version information, access rights, and the like.

"META-INF" is a directory in which electronic signature information (APK signing information) of the application is stored.

"Assets" is a directory in which a file or data used in the application is stored.

"Resources.arsc" is a file including text or multilingual text information used in the application.

"Lib" is a directory in which a third party or an external library used in the application is stored.

"Classes.dex" is a file including an executable code of the application. In an Android application package, the "classes.dex" file is generated by compiling a source code of the application in the form of a "dex" file which may be run in a Dalvik virtual machine of Google.

"Res" is a directory in which content, such as images or pictures, an icon file, and the like, used in the application is stored.

Figure 3:
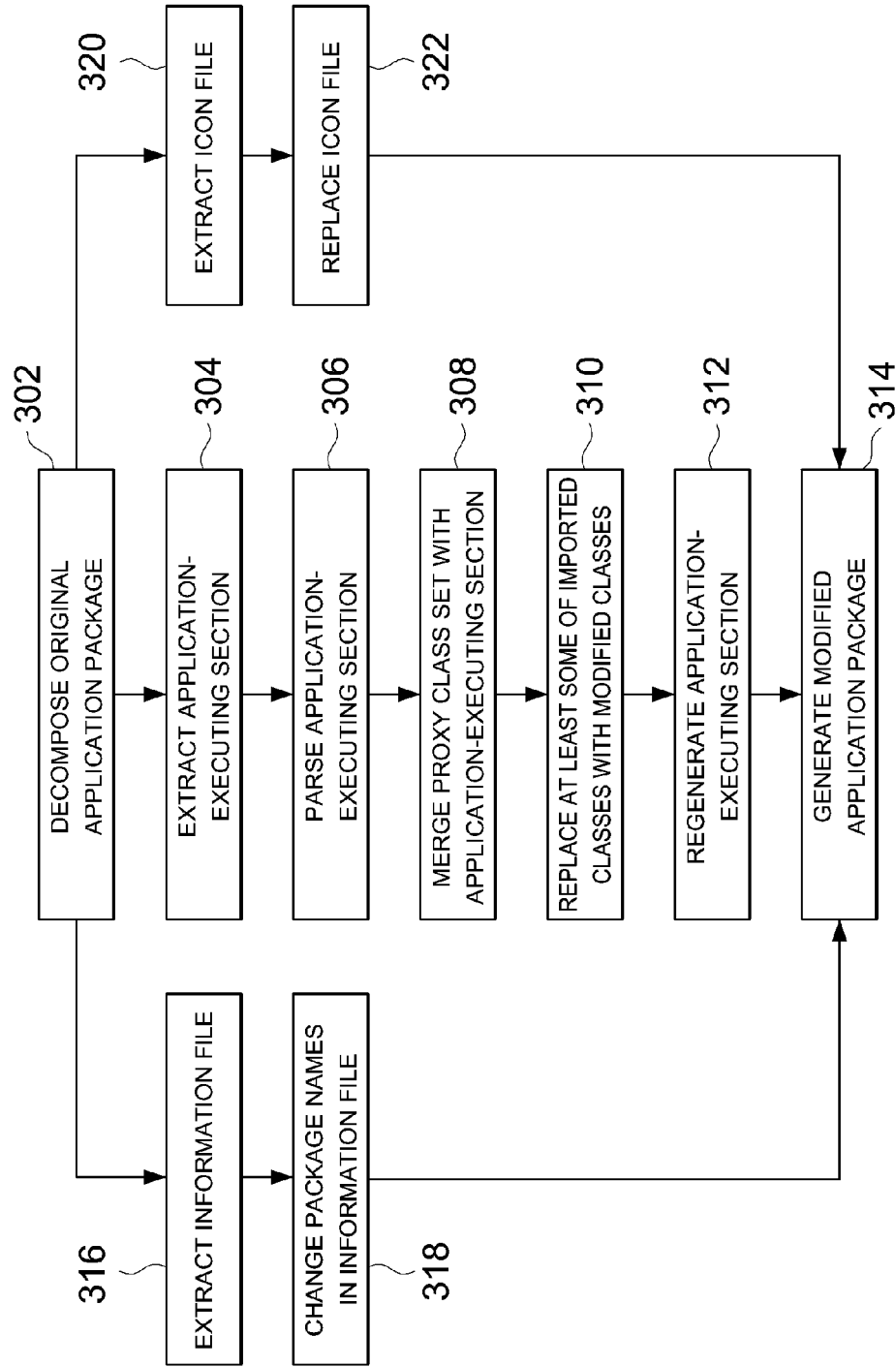
FIG. 3 is a flowchart illustrating a method of converting an application according to an exemplary embodiment of the present disclosure.

FIG. 3 is a flowchart illustrating a method 300 of converting an application according to an exemplary embodiment of the present disclosure. The method 300 shown in FIG. 3 may be performed by, for example, the computing device 12 including one or more processors and a memory storing one or more programs executed by the one or more processors. Although the flowchart illustrates the method 300 divided into a plurality of operations, at least some operations may be performed in a different order, performed in combination with each other, omitted, or performed in sub-operations, or at least one operation not shown in the drawing may be added and performed.

In operation 302, the computing device 12 decomposes an original application package. For example, when the original application package is an APK file, the computing device 12 may decompose the APK file by decompressing the original application package and obtain the physical directories and files described above with reference to FIG. 2.

In operation 304, the computing device 12 extracts an application-executing section from the decomposed original application package. In an exemplary embodiment, the application-executing section includes an executable code of the corresponding application and may be configured in the form of binary code or a file. For example, when the original application package is an APK file, an extracted application-executing section becomes the "classes.dex" file.

In operation 306, the computing device 12 parses the application-executing section. For example, when the application-executing section is the "classes.dex" file, the computing device 12 parses the "classes.dex" file with reference to a file format of the "classes.dex" file. The file format of the "classes.dex" file is disclosed and provided by Google, and when the "classes.dex" file is parsed, it is possible to identify a class, a method structure, and the like of the application.

In operation 308, the computing device 12 merges a proxy class set with the parsed application-executing section.

Figure 4:
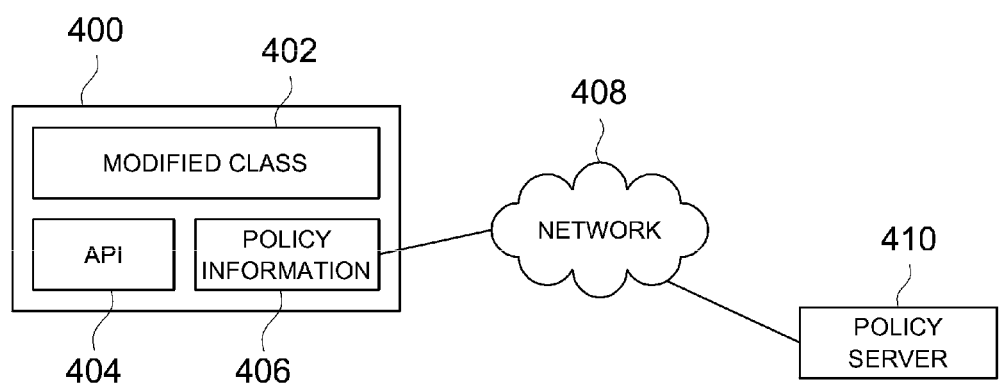
FIG. 4 is a block diagram illustrating a proxy class set according to an exemplary embodiment of the present disclosure.

FIG. 4 is a block diagram illustrating a proxy class set 400 according to an exemplary embodiment of the present disclosure. The proxy class set 400 according to an exemplary embodiment of the present disclosure is a program-executing code including an additional function to be added to an application and is configured in the same format as an application-executing section. For example, when the application-executing section is the "classes.dex" file, the proxy class set 400 may also be configured in the form of a "dex" file.

As shown in FIG. 4, the proxy class set 400 according to an exemplary embodiment of the present disclosure may include a modified class 402, an API 404, and policy information 406. Among them, the modified class 402 is a class for executing the additional function to be added to the application.

The modified class 402 may be configured to replace one or more of classes imported by the application to be converted or one or more of super classes of a class imported by the application to be converted. As an example, by replacing a class related to a function of writing data in the computing device 12, the modified class 402 may cause the application to store data not in an application directory but in a preset secure storage. Also, as another example, the modified class 402 may replace a class related to a function of controlling a camera. In this case, the modified class 402 may sense the application's access to the camera function, detect a current location of the computing device 12, and allow access to the camera function only when the computing device 12 is not in a preset security zone (inside a specific building and the like). The proxy class set 400 according to an exemplary embodiment of the present disclosure may include one or more modified classes 402.

The API 404 is an interface for controlling a function required for executing the one or more modified classes 402. Also, the policy information 406 is information imported by the API 404. For example, when the API 404 performs a function related to the security of the computing device 12 or a user who uses the computing device 12, the policy information 406 may be security policy information required for executing the security function. As shown in the drawing, the policy information 406 may be received from a policy server 410 at a remote location via a network 408, and the API 404 may include program-executing code for receiving and updating the policy information 406 from the policy server 410.

The computing device 12 may be configured to merge the proxy class set 400 with a class definition field (class_def) of the parsed application-executing section.

Referring back to FIG. 3, in operation 310, the computing device 12 replaces at least some of the classes imported into the application-executing section with the modified class 402 in the proxy class set 400. For example, the application-executing section is assumed to import the following classes.

```
import android.app.Activity;
import android.os.Bundle;
import android.widget.TextView;
...
```

The computing device 12 may replace "android.app.Activity" and "android.widget.TextView" among the classes with "android.app.wrapped.Activity" and "android.widget.wrapped.TextView" which are the modified classes 402, respectively. This is expressed by program code as follows.

```
import android.app.wrapped.Activity;
import android.os.Bundle;
import android.widget.wrapped.TextView;
...
```

When at least some of the classes imported into the application-executing section are replaced with the modified classes 402 in the proxy class set 400 in this manner, it is possible to effectively add a desired additional function to the application while minimizing modification of the source code of the application.

Next, in operation 312, the computing device 12 regenerates the application-executing section converted through operations 308 and 310. For example, when the application-executing section is the "classes.dex" file, the computing device 12 redexes the "classes.dex" file to reflect the changes, thereby regenerating a converted "classes.dex" file.

In operation 314, the computing device 12 generates a modified application package. For example, when the original application package is an APK file, the computing device 12 may generate the modified application package by replacing the existing "classes.dex" file with the "classes.dex" file generated in operation 312 and recompressing files and directories constituting the APK file. The generated modified application package may be signed using a preset signing key.

Meanwhile, the method 300 for converting an application according to an exemplary embodiment of the present disclosure may additionally include an operation of changing a package name and an icon of the original application package. The operation of changing the package name and an icon of the original application package is performed after operation 302 and may be performed in parallel with operations 304 to 312 described above or performed before or after operations 304 to 312.

First, an operation of changing the package name of the original application package will be described below.

In operation 316, the computing device 12 extracts an information file related to running of the original application package from the original application package decomposed in operation 302. For example, when the original application package is an APK file, the information file may be the "AndroidManifest.xml" file.

In operation 318, the computing device 12 changes the package name of the original application package in the information file. For example, it is assumed that an application package name in the information file is as follows.

package com.abc.emm.main;

In this case, the computing device 12 may change the package name "com.abc.emm.main" to, for example, "com.abc.wrapped.emm.main." This is expressed by program code as follows.

package com.abc.wrapped.emm.main;

In a general computing system, a package having the same package name as a package which has already been installed cannot be installed. Therefore, when the package name of the converted application is changed according to an exemplary embodiment of the present disclosure, it is possible to simultaneously use the unconverted application and the converted application in one device. For example, in the case of an email application, the unconverted original application may be used for personal use, and the converted application may be used for work.

Next, an operation of changing an icon of the original application package will be described below.

In operation 320, the computing device 12 extracts an icon file of the original application package from the original application package decomposed in operation 302. For example, when the original application package is an APK file, the icon file may be stored in the "res" directory.

In operation 322, the computing device 12 replaces the icon file with an icon file for the converted application.

When an icon of a converted application is changed according to an exemplary embodiment of the present disclosure, a user may visually distinguish between an unconverted application and the converted application in an environment of one device in which both the unconverted application and the converted application are installed.

The information file in which the package name has been changed and the replaced icon are included in the modified application package generated in operation 314.

Meanwhile, exemplary embodiments of the present disclosure may include a program for performing the methods described herein in a computer and a computer-readable recording medium including the program. The computer-readable recording medium may include program instructions, local data files, and local data structures solely or in combination. The medium may be specially designed and configured for the present disclosure or well-known and available to those of ordinary skill in the computer software field. Examples of the computer-readable recording medium include magnetic media, such as a hard disk, a floppy disk, and a magnetic tape, optical recording media, such as a compact disc read-only memory (CD-ROM) and a digital versatile disc (DVD), and hardware devices, such as a ROM, a RAM, a flash memory, and the like, specially configured to store and execute program instructions. Examples of the program may include high-level language code executable by a computer using an interpreter or the like as well as machine language code generated by a compiler.

According to exemplary embodiments of the present disclosure, it is possible to effectively convert an application into an application whose security is strengthened according to the purpose of EMM while minimizing modification of the source code of the application.

Also, according to exemplary embodiments of the present disclosure, when an application is converted, a name of an application package is changed, so that the unconverted application and the converted application can be installed together in the same computing device.

Further, according to exemplary embodiments of the present disclosure, when an application is converted, an icon of the application is changed, so that a user can visually recognize whether the application has been converted.

Although exemplary embodiments of the present disclosure have been described in detail above, those of ordinary skill in the art to which the present disclosure pertains will appreciate that various modifications may be made without departing from the scope of the present disclosure. Therefore, the scope of the present disclosure is to be determined by the following claims and their equivalents, and is not restricted or limited by the foregoing detailed description.

What is claimed is:

1. A method for converting an application, the method being performed by a computing device comprising one or more processors and a memory storing one or more programs executed by the one or more processors, the method comprising:
   decomposing an original application package;
   extracting an application-executing section from the decomposed original application package; and
   merging a proxy class set comprising one or more modified classes with the application-executing section,
   wherein each of the one or more modified classes is a class for executing an additional function to be added to the original application package, and
   wherein the merging of the proxy class set merges the proxy class set with a class definition field of the application-executing section.

2. The method of claim 1, wherein the proxy class set further comprises:
   one or more application programming interfaces (APIs) used to execute the one or more modified classes; and
   one or more pieces of policy information imported by the APIs.

3. The method of claim 2, wherein the APIs comprise program-executing code for receiving the one or more pieces of policy information from a preset remote server and updating the one or more pieces of policy information.

4. The method of claim 1, further comprising:
   replacing one or more classes imported into the application-executing section with the one or more modified classes in the proxy class set; and
   generating a modified application package comprising the application-executing section in which the one or more classes have been replaced with the one or more modified classes.

5. The method of claim 1, further comprising:
   extracting an information file related to the original application package from the decomposed original application package; and
   changing a package name of the original application package in the information file.

6. The method of claim 1, further comprising:
   extracting an icon file of the original application package from the decomposed original application package; and
   replacing the icon file with a substitute icon file.

7. A computing device comprising:
   one or more processors; and
   a memory storing one or more programs,
   wherein the one or more programs are executed by the one or more processors to perform:
   decomposing an original application package;
   extracting an application-executing section from the decomposed original application package; and
   merging a proxy class set comprising one or more modified classes with the application-executing section,
   wherein each of the one or more modified classes is a class for executing an additional function to be added to the original application package, and
   wherein the merging of the proxy class set merges the proxy class set with a class definition field of the application-executing section.

8. The computing device of claim 7, wherein the proxy class set further comprises:
   one or more application programming interfaces (APIs) used to execute the one or more modified classes; and
   one or more pieces of policy information imported by the APIs.

9. The computing device of claim 8, wherein the APIs comprise program-executing code for receiving the one or more pieces of policy information from a preset remote server and updating the one or more pieces of policy information.

10. The computing device of claim 7, wherein the one or more programs are executed by the one or more processors to further perform:
    replacing one or more classes imported into the application-executing section with the one or more modified classes in the proxy class set; and
    generating a modified application package comprising the application-executing section in which the one or more classes have been replaced with the one or more modified classes.

11. The computing device of claim 7, wherein the one or more programs are executed by the one or more processors to further perform:
    extracting an information file related to the original application package from the decomposed original application package; and
    changing a package name of the original application package in the information file.

12. The computing device of claim 7, wherein the one or more programs are executed by the one or more processors to further perform:
    extracting an icon file of the original application package from the decomposed original application package; and
    replacing the icon file with a substitute icon file.

* * * * *